(12) United States Patent
Cheng et al.

(10) Patent No.: US 10,445,276 B2
(45) Date of Patent: Oct. 15, 2019

(54) SERVER SYSTEM HAVING A HOT PLUG MOTHERBOARD

(71) Applicant: UNIVERSAL SCIENTIFIC INDUSTRIAL (SHANGHAI) CO., LTD., Shanghai (CN)

(72) Inventors: Cheng-Lung Cheng, Shanghai (CN); Ching-Tung Chen, Shanghai (CN)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/042,029

(22) Filed: Jul. 23, 2018

(65) Prior Publication Data
US 2019/0227970 A1 Jul. 25, 2019

(30) Foreign Application Priority Data
Jan. 19, 2018 (CN) .......................... 2018 1 0053444

(51) Int. Cl.
G06F 13/40 (2006.01)
G06F 13/42 (2006.01)
(52) U.S. Cl.
CPC ...... *G06F 13/4022* (2013.01); *G06F 13/4282* (2013.01); *G06F 2213/0026* (2013.01)
(58) Field of Classification Search
CPC ...... G06F 13/4081; G06F 1/184; G06F 1/187; G06F 1/185
USPC ........................................................ 710/302
See application file for complete search history.

(56) References Cited

U.S. PATENT DOCUMENTS

| 7,384,276 | B2* | 6/2008 | Lee | G06F 13/4081 |
| | | | | 439/76.1 |
| 7,583,043 | B2* | 9/2009 | Chung | G05D 23/1917 |
| | | | | 318/634 |
| 7,839,624 | B2* | 11/2010 | Lin | G06F 1/184 |
| | | | | 361/679.02 |
| 7,894,195 | B2* | 2/2011 | Lin | H05K 7/1487 |
| | | | | 361/727 |
| 7,944,700 | B2* | 5/2011 | Wang | G06F 1/183 |
| | | | | 361/727 |
| 8,014,144 | B2* | 9/2011 | Cheng | G06F 1/187 |
| | | | | 361/679.33 |
| 8,922,987 | B2* | 12/2014 | Lin | H05K 7/1489 |
| | | | | 312/223.1 |
| 9,468,093 | B2* | 10/2016 | Peterson | H05K 1/0278 |

(Continued)

FOREIGN PATENT DOCUMENTS

| CN | 102566680 A | 7/2012 |
| TW | 201516853 A | 5/2015 |
| TW | I564728 B | 1/2017 |

*Primary Examiner* — Brian T Misiura
(74) *Attorney, Agent, or Firm* — Li & Cai Intellectual Property (USA) Office

(57) ABSTRACT

Disclosed is a server system having a hot plug motherboard. The server system includes a motherboard module, at least one midplane board and at least one hard disk module. The motherboard module includes a plurality of motherboards. The midplane board is coupled by means of hot plugging to each of the motherboards. The midplane board includes at least one Peripheral Component Interconnect Express (PCIe) slot, and the PCIe slot is configured to be plugged with a PCIe card. The hard disk module includes a plurality of hard disks being coupled to the PCIe card through a signal wire.

11 Claims, 8 Drawing Sheets

(56) References Cited

U.S. PATENT DOCUMENTS

| | | | |
|---|---|---|---|
| 9,535,468 B2* | 1/2017 | Yu | G06F 1/185 |
| 9,603,251 B1* | 3/2017 | Ignomirello | H05K 7/1487 |
| 9,788,453 B2* | 10/2017 | Huang | H05K 7/1492 |
| 9,795,055 B1* | 10/2017 | Campbell | H05K 7/20145 |
| 2017/0011002 A1 | 1/2017 | Shin | |
| 2017/0202111 A1* | 7/2017 | Huang | H05K 7/1489 |

* cited by examiner

SERVER SYSTEM HAVING A HOT PLUG MOTHERBOARD

FIELD OF THE DISCLOSURE

The instant disclosure relates to a server system, and in particular, to a server system having a midplane board including Peripheral Component Interconnect Express (PCIe) slot and a hot plug motherboard.

BACKGROUND OF THE DISCLOSURE

Small and medium-sized enterprises require a server system to process a large amount of information for implementing processing and storing function. Therefore, the server system may include one or more storage devices and one or more motherboards. However, the signal wires inside of the server system may be messy when the server system has a plurality of storage devices and a plurality of motherboards. Because the PCIe slot of the motherboard is connected to the hard disk module through the signal wire, it is inconvenient to unplug the signal wires before exchanging the motherboard by hot plugging.

SUMMARY OF THE DISCLOSURE

One aspect of the present disclosure relates to a server system having a hot plug motherboard.

The instant disclosure provides a server system having a hot plug motherboard. The server system includes a motherboard module, at least one midplane board and at least one hard disk module. The motherboard module includes a plurality of motherboards. The midplane board is coupled by means of hot plugging to each of the motherboards. The midplane board includes at least one PCIe slot, the PCIe slot is configured to be plugged with a PCIe card. The hard disk module includes a plurality of hard disks being coupled to the PCIe card through a first signal wire.

Furthermore, the server system includes a backplane with one end being coupled to the PCIe card through the signal wire, and the other end being coupled to each of the hard disks of the hard disk module.

Furthermore, the plurality of motherboards includes a first motherboard and a second motherboard, and the first motherboard and the second motherboard are parallel to each other.

Furthermore, the plurality of motherboards includes a third motherboard, a fourth motherboard, a fifth motherboard and a sixth motherboard which are connected to each other, the third motherboard and the fourth motherboard are parallel to each other, the fifth motherboard and the sixth motherboard are parallel to each other, the third motherboard and the fourth motherboard are disposed on the fifth motherboard and the sixth motherboard, the third motherboard is disposed opposite to the fifth motherboard, the fourth motherboard is disposed opposite to the sixth motherboard, the at least one midplane board includes a first midplane including a first hot plug connector, the first midplane is coupled to a second hot plug connector of the fifth motherboard and a third hot plug connector of the sixth motherboard through the first hot plug connector, an extension board is disposed on the first midplane board, the extension board includes a fourth hot plug connector and is electrically connected to the first midplane board through a second signal wire, and the extension board is coupled to a fifth hot plug connector of the third motherboard and a sixth hot plug connector of the fourth motherboard through the fourth hot plug connector Furthermore, the server system includes a power module disposed at a first position among the plurality of motherboards, the power module is configured to provide electrical energy to the server system, the midplane board is T-shaped and includes an extension portion disposed at a second position among the plurality of motherboards and corresponding to the power module, and the PCIe slot is disposed on the extension portion.

Furthermore, the server system includes a power module disposed on one long longitudinal side of the server system, the power module is configured to provide electrical energy to the server system, the midplane board is a L-shaped board, and the midplane board includes an extension portion disposed at a position which is among the longitudinal long side of the server system and is corresponding to the power module, and the PCIe slot is disposed on the extension portion.

Furthermore, the server system includes a temperature sensing module and a fan module. The temperature sensing module is for sensing the temperature of heating elements of each of the motherboards and the temperature of each of the hard disks. The fan module is for decreasing the temperature of the heating elements of each of the motherboards and the temperature of each of the hard disks.

The instant disclosure further provides a server system. The server system includes a machine casing, a motherboard module and at least one midplane board. The motherboard module includes a plurality of motherboards configured in the machine casing. The midplane board is coupled by means of hot plugging to each of the motherboards. The midplane board includes at least one PCIe slot being configured to be plugged with a PCIe card.

Furthermore, the midplane board is T-shaped or L-shaped and includes an extension portion. The PCIe slot is disposed on the extension portion.

Furthermore, the server system includes a power module, a hard disk module, a backplane, a temperature sensing module and a fan module. The power module is configured to provide electrical energy to the server system. The hard disk module includes a plurality of hard disks. The plurality of hard disks are coupled to the PCIe card through a signal wire. One end of the backplane is coupled to the PCIe card through the signal wire, and the other end is coupled to each of the hard disks of the hard disk module. The temperature sensing module is for sensing the temperature of heating elements of each of the motherboards and the temperature of each of the hard disks. The fan module is for decreasing the temperature of the heating elements of each of the motherboards and the temperature of each of the hard disks.

Therefore, the beneficial effects of the present disclosure embody in that a server system with a hot plug motherboard further includes a plurality of motherboards and midplane boards, the midplane board includes at least one PCIe slot configured to be plugged with a PCIe card, and the midplane board is coupled by means of hot plugging to each of the motherboards for increasing convenience.

Besides, the fans of the fan module are used for decreasing temperature of the heating elements of each of the motherboards and the temperature of each of the hard disks For further understanding of the instant disclosure, reference is made to the following detailed description illustrating the embodiments of the instant disclosure. The description is only for illustrating the instant disclosure, and should not be construed as limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EMBODIMENTS

Figure 1:
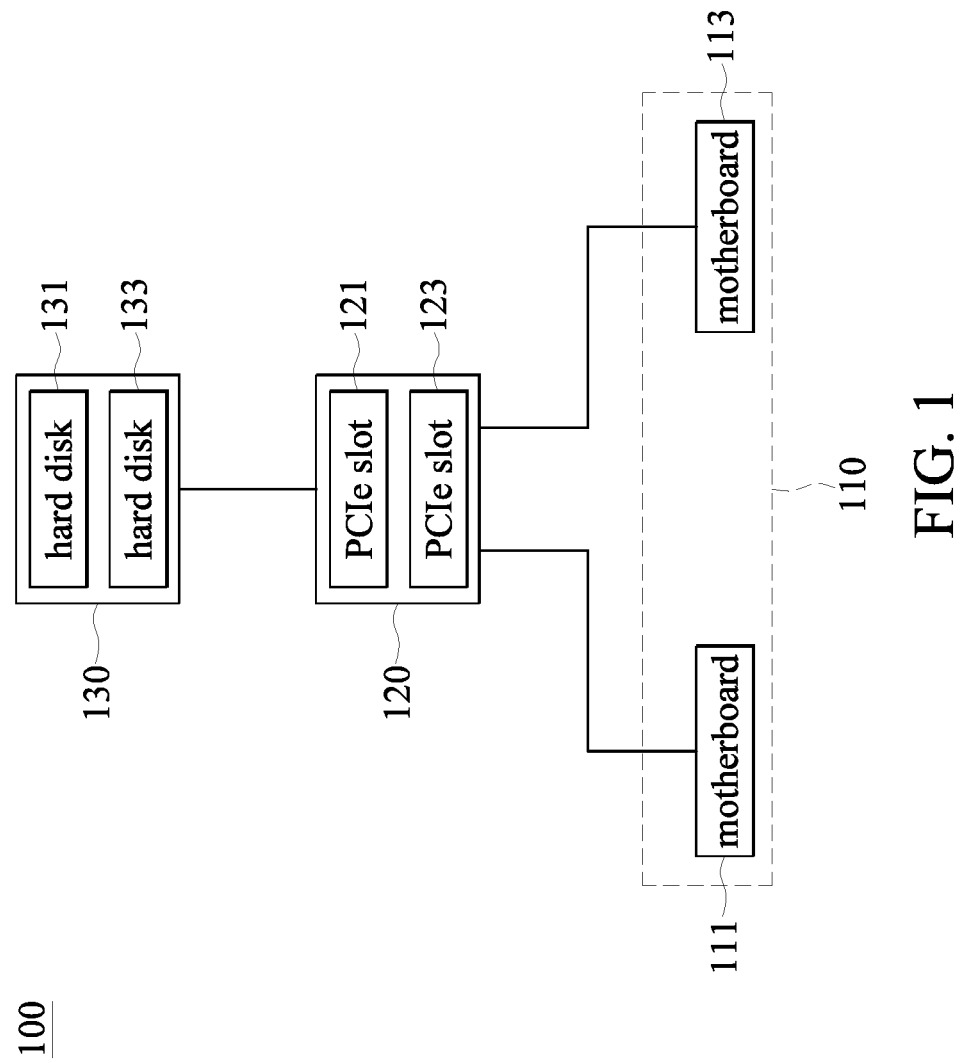
FIG. 1 shows a block diagram of a server system having a hot plug motherboard of one embodiment of the instant disclosure.

Reference is made to FIG. 1. FIG. 1 shows a block diagram of a server system having a hot plug motherboard of one embodiment of the instant disclosure.

The server system 100 includes a motherboard module 110, a midplane board 120 and a hard disk module 130. In one embodiment, the motherboard module 110 includes a motherboard 111 and a motherboard 113. The midplane board 120 includes at least one PCIe slot. For example, the midplane board 120 includes PCIe 121 and PCIe 123 which are configured to be plugged with PCIe cards. The motherboard 111 and the motherboard 113 are coupled to the midplane board 120 via hot plugging. The motherboard 111 and motherboard 113 are respectively electrically connected to the PCIe slot 121 and PCIe slot 123 through the midplane board 120. In other word, the motherboard module 110 and midplane board 120 all possess hot plug function. A user can exchange the motherboard 111 or the motherboard 113 of the motherboard module 110 when the server system 100 is turned on. More specifically, the instant disclosure disposes the PCIe slot on the midplane board 120 rather than on the motherboard, and the PCIe slot is coupled to the hot plug connector between the motherboards 111 and 113 and the midplane board 120, so that the user does not need to unplug the signal wire of the PCIe slot when replacing the motherboard 111 and motherboard 113, and thus a function of real hot plugging can be achieved. For example, the motherboard 111 and the motherboard 113 can be coupled to the hot plug connector of the midplane board 120 via hot plug connector.

The hard disk module 130 may include hard disk 131 and hard disk 133 coupled to the PCIe card of the midplane board 120 through the signal wire. In other words, the PCIe card of the midplane board 120 transmits data to or receives data from the hard disk 131 and the hard disk 133 through the signal wire. More specifically, there may be four, six or eight motherboards, there may be two, three or four midplane boards, there may be four, six or eight PCIe slots, there may be six or ten hard disks. The number of the motherboard, the midplane board, the PCIe slot or the hard disk are not limited in the present disclosure.

Figure 2:
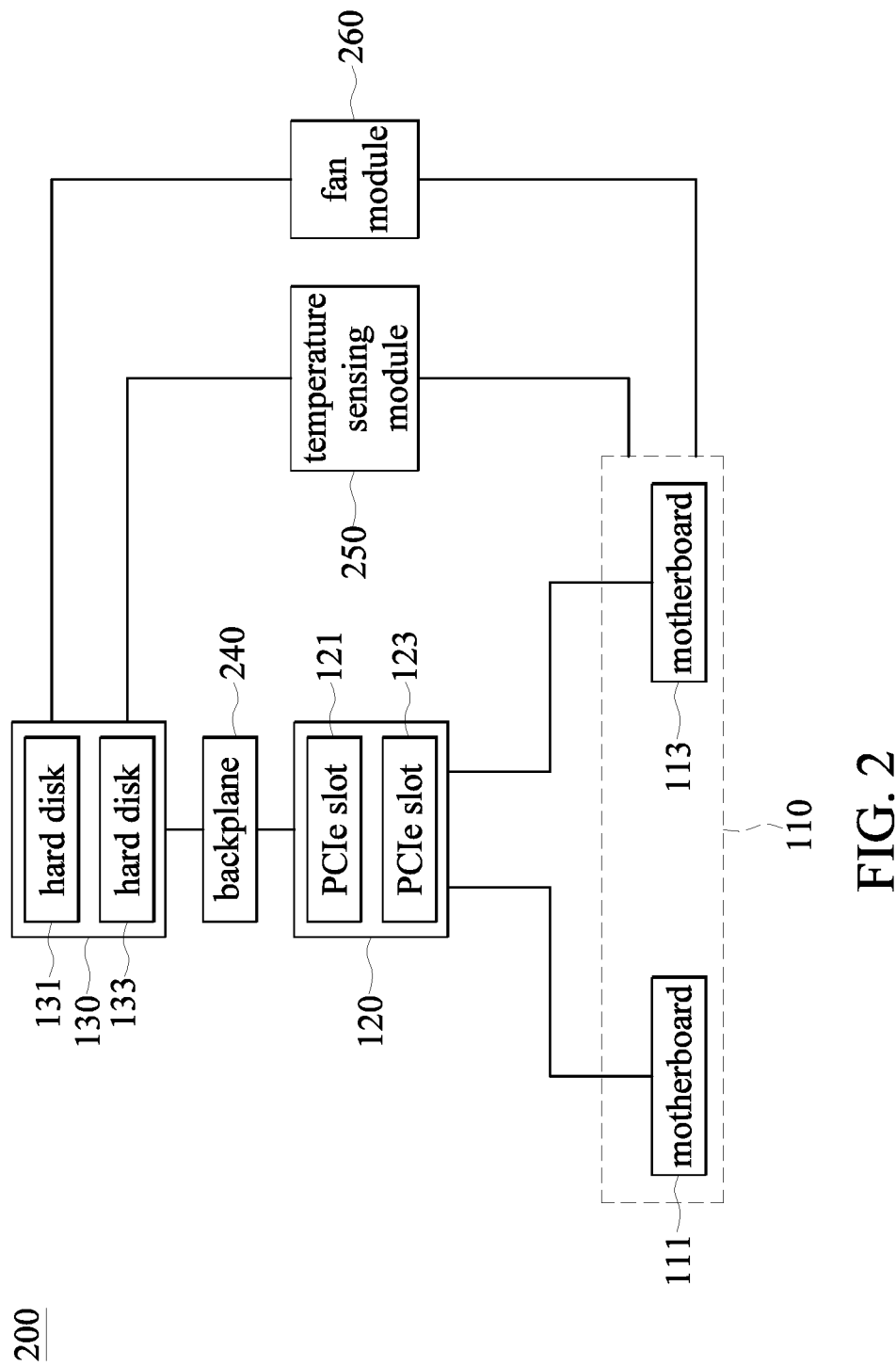
FIG. 2 shows a block diagram of a server system having a hot plug motherboard of another embodiment of the instant disclosure.

Reference is made to FIG. 2. FIG. 2 shows a block diagram of a server system having a hot plug motherboard of another embodiment of the instant disclosure.

The server system 200 includes a motherboard module 110, a midplane board 120, a hard disk module 130, a backplane 240, a temperature sensing module 250 and a fan module 260. For brevity of description, regarding to the motherboard module 110, the midplane board 120 and the disk module 130, please refer to the aforementioned description of FIG. 1. The backplane 240 is coupled to the midplane board 120 and the hard disk 130. One end of the backplane 240 is coupled to the PCIe card of the midplane board 120 through the signal wire, and the other end of the backplane 240 is coupled to each of the hard disk 131 and the hard disk 133 of the hard disk module 130. For example, one end of the backplane 240 may include one or more PCIe connectors, and the sizes of the PCIe connectors may be different.

The temperature sensing module 250 is coupled to the motherboard module 110 and the hard disk module 130. The temperature sensing module 250 is configured to sense the temperature of the motherboard 111, the motherboard 113, the hard disk 131 and the hard disk 133. The fan module 260 is coupled to the motherboard module 110 and hard disk module 130. The fan module 260 is configured to decrease the temperature of the motherboard 111, the motherboard 113, the hard disk 131 and the hard disk 133. More specifically, the fan module 260 is configured to decrease the temperature of heating elements of the motherboard 111 and motherboard 113. The heating elements can be, for example, Computer Processing Unit (CPU) or Graphics Processing Unit (GPU), so as to enhance the heat dissipation efficiency of the server system 200.

Figure 3A:
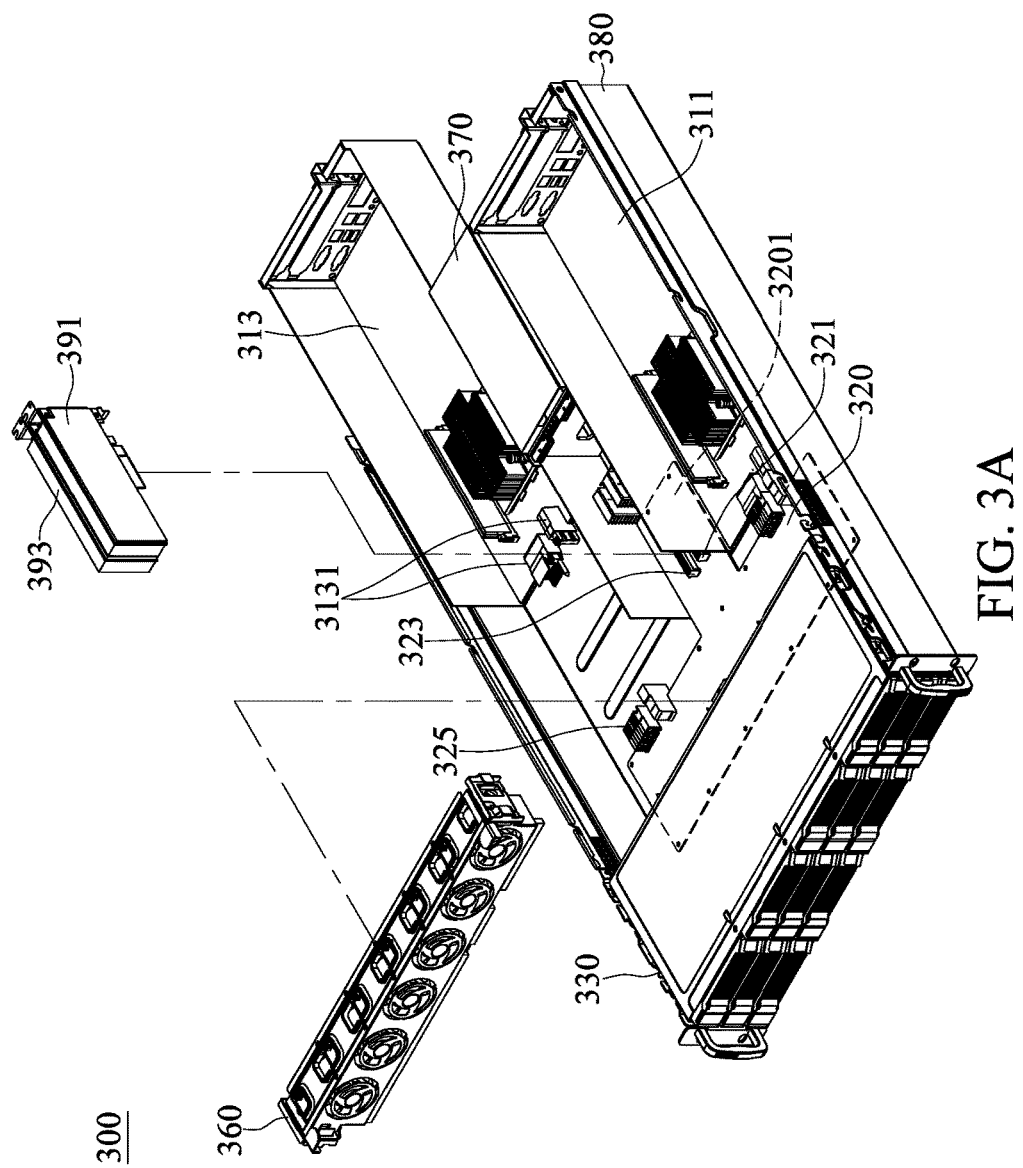
FIG. 3A shows a three-dimensional exploded schematic view of a server system having a hot plug motherboard of one embodiment of the instant disclosure.
Figure 3B:
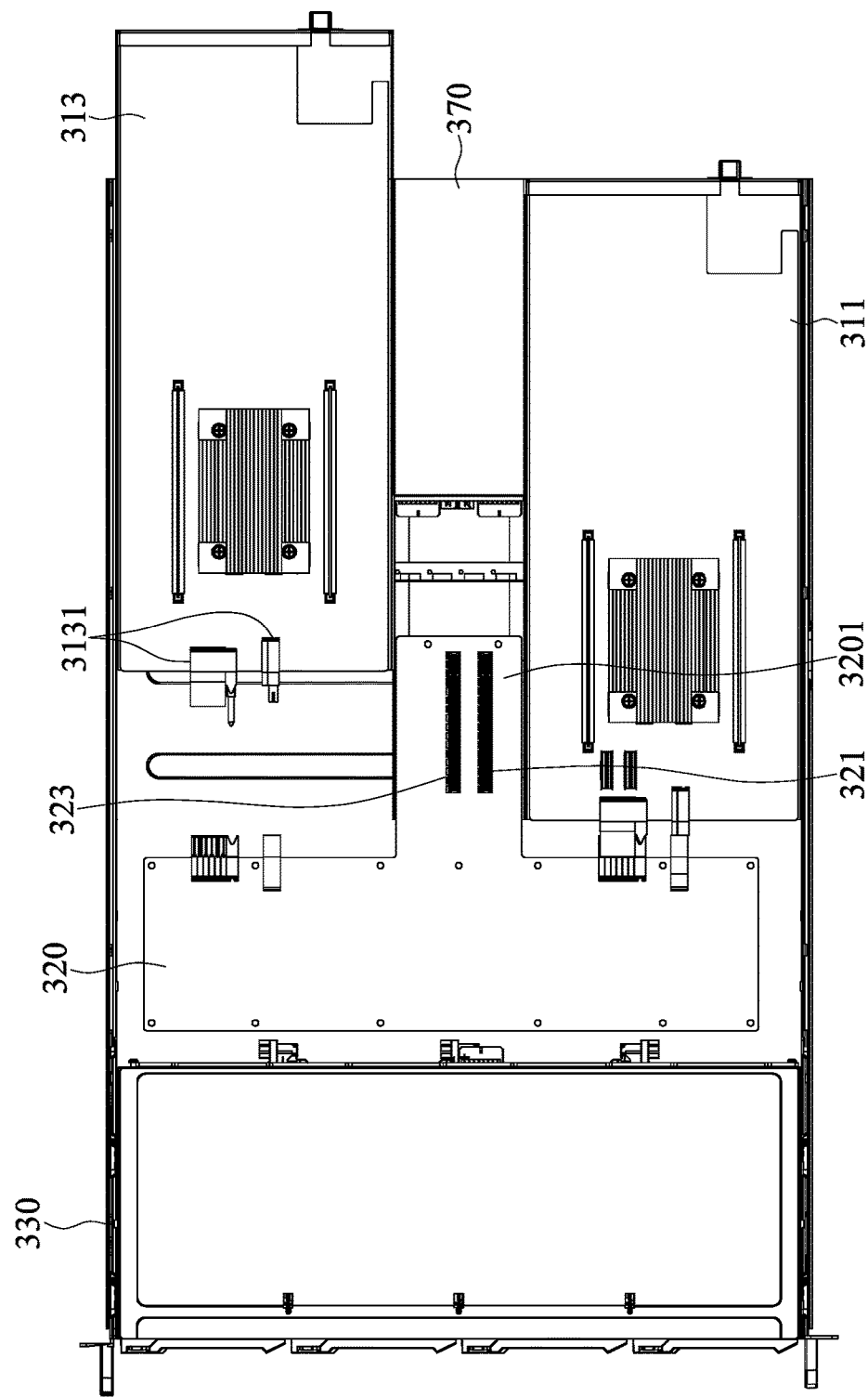
FIG. 3B shows a top view of a server system having a hot plug motherboard of one embodiment of the instant disclosure.

Reference is made to FIG. 3A and FIG. 3B. FIG. 3A shows a three-dimensional exploded schematic view of a server system having a hot plug motherboard of one embodiment of the instant disclosure. FIG. 3B shows a top view of a server system having a hot plug motherboard of one embodiment of the instant disclosure.

A server system 300 includes a first motherboard 311, a second motherboard 313, a midplane board 320, a hard disk module 330, a fan module 360, a power module 370 and a machine casing 380. The midplane board 320 includes a PCIe slot 321 and a PCIe slot 323. The server system 300 includes the first motherboard 311 and the second motherboard 313 which are parallel to each other. In one embodiment, the first motherboard 311 and the second motherboard 313 are coupled to the midplane board 320 of the server system 300. More specifically, the second motherboard 313 includes a hot plug connector 3131, the midplane board 320 includes a hot plug connector 325, and the second motherboard 313 is coupled to the hot plug connector 325 of the midplane board 320 through the hot plug connector 3131. In one embodiment, the PCIe slot 321 and the PCIe slot 323 are disposed on the midplane board 320. The PCIe slot 321 and the PCIe slot 323 are configured to be plugged with a PCIe card 391 and a PCIe card 393 respectively. The fan module 360 is disposed among the hard disk module 330, the first motherboard 311 and the second motherboard 313. The fan module 360 is disposed on the midplane board 320. The midplane board 320 is T-shaped and includes an extension portion 3201, and the PCIe slot 321 and the PCIe slot 323 are disposed on the extension portion 3201. In one embodiment, the fan module 360 includes six fans for decreasing the temperature of hard disk and heating elements of motherboard. The power module 370 is disposed among the first motherboard 311, the second motherboard 313 and the midplane board 320. The power module 370 is configured to provide electrical energy to the electrical elements of the server system 300, and may be, for example, a boost power supply, a buck power supply or a boost-buck power supply.

Figure 3C:
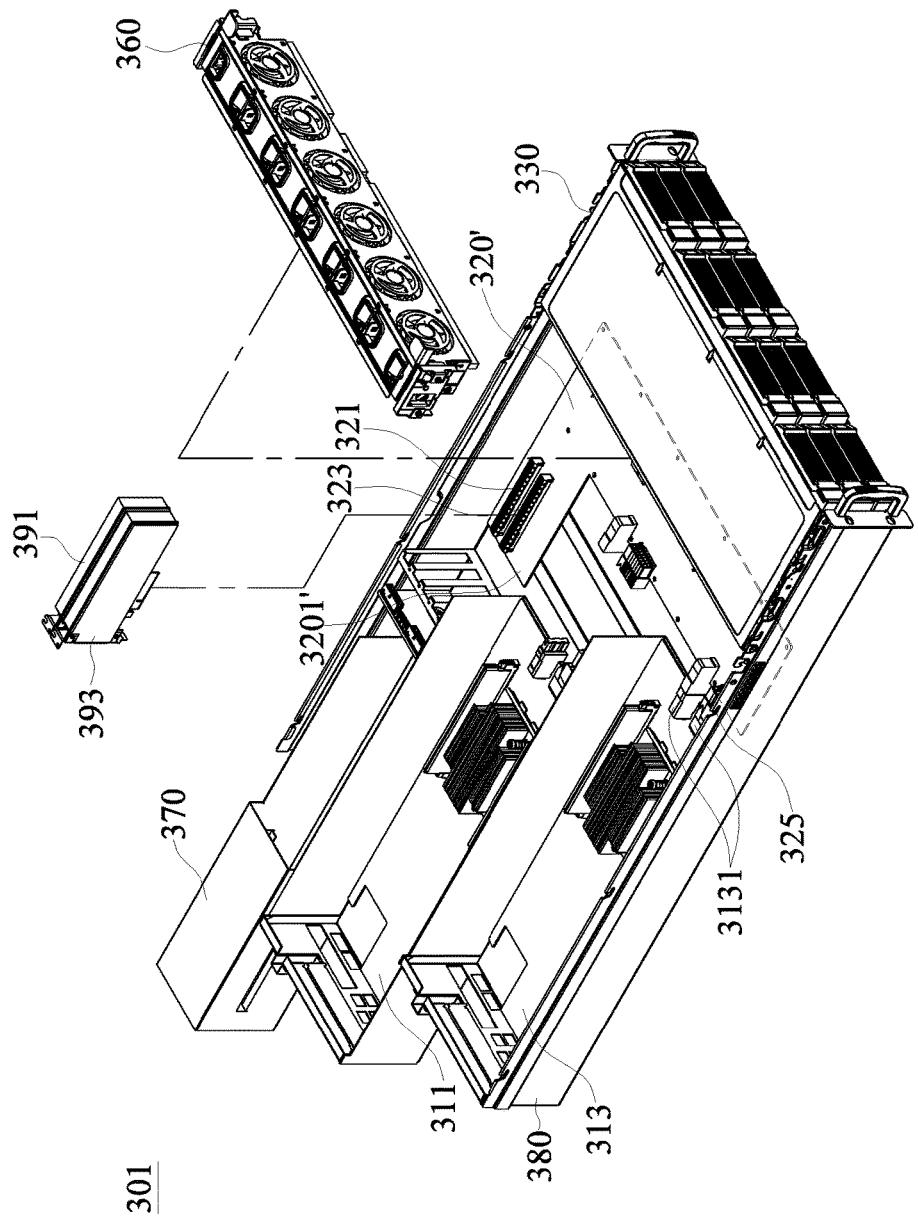
FIG. 3C shows a three-dimensional exploded schematic view of a server system having a hot plug motherboard of another embodiment of the instant disclosure.
Figure 3D:
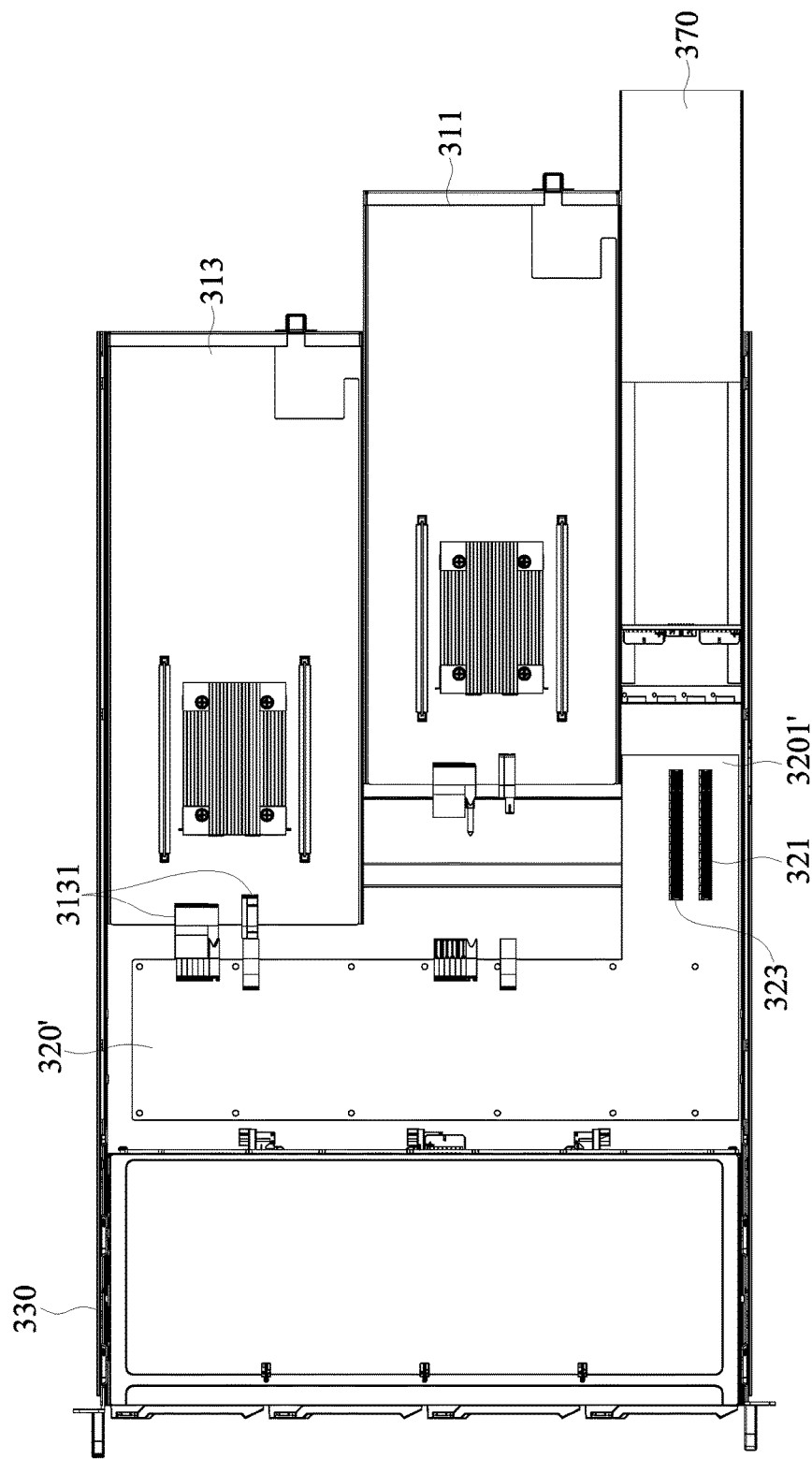
FIG. 3D shows a top view of a server system having a hot plug motherboard of another embodiment of the instant disclosure.

Reference is made to FIG. 3C and FIG. 3D. FIG. 3C shows a three-dimensional exploded schematic view of a server system having a hot plug motherboard of another embodiment of the instant disclosure. FIG. 3D shows a top view of a server system having a hot plug motherboard of another embodiment of the instant disclosure. The motherboard 311 is disposed besides the motherboard 313. The power module 370 is disposed on one longitudinal side of the server system 301. A midplane board 320' is L-shaped and includes an extension portion 3201' that is disposed at the longitudinal side of the server system 301 and the power module 370. The PCIe slot 321 and the PCIe slot 323 are disposed on the extension portion 3201'.

Figure 4A:
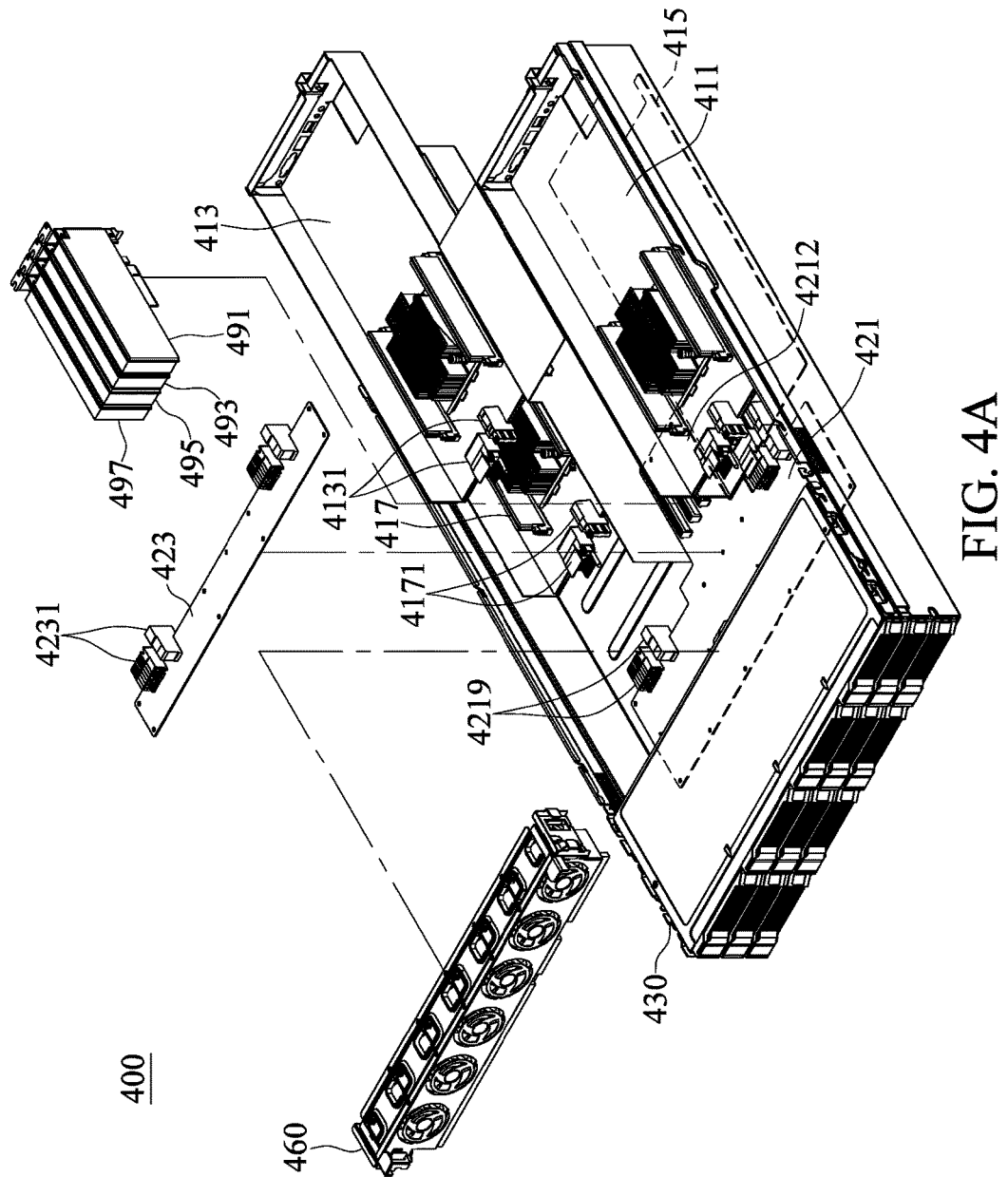
FIG. 4A shows a three-dimensional exploded schematic view of a server system having a hot plug motherboard of yet another embodiment of the instant disclosure.
Figure 4B:
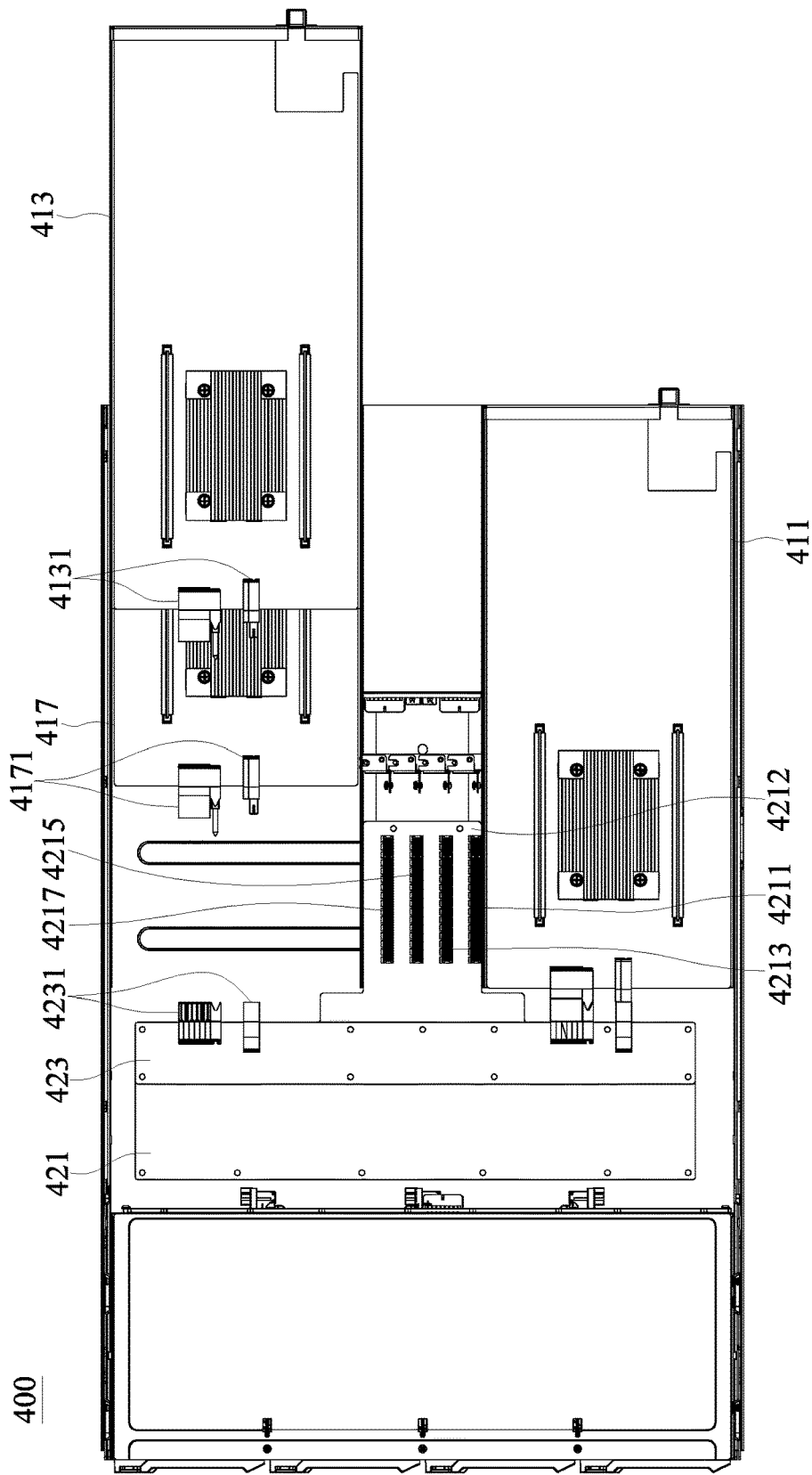
FIG. 4B shows a top view of a server system having a hot plug motherboard of yet another embodiment of the instant disclosure.

Reference is made to FIG. 4A and FIG. 4B. FIG. 4A shows a three-dimensional exploded schematic view of a server system having a hot plug motherboard of yet another embodiment of the instant disclosure. FIG. 4B shows a top view of a server system having a hot plug motherboard of yet another embodiment of the instant disclosure. The server system 400 includes a third motherboard 411, a fourth motherboard 413, a fifth motherboard 415 and a sixth motherboard 417 which are connected to each other. The server system 400 further includes hard disk module 430 and fan module 460. The third motherboard 411 and the fourth motherboard 413 are parallel to each other. The fifth motherboard 415 and the sixth motherboard 417 are parallel to each other. The third motherboard 411 and the fourth motherboard 413 are disposed on the fifth motherboard 415 and the sixth motherboard 417. The third motherboard 411 is disposed opposite to the fifth motherboard 415. The fourth motherboard 413 is disposed opposite to the sixth motherboard 417. A first midplane board 421 is coupled to the hot plug connector of the fifth motherboard 415 and the hot plug connector of the sixth motherboard 417 through hot plug connector. In one embodiment, the first midplane board 421 includes a hot plug connector 4211, the sixth motherboard 417 includes a hot plug connector 4171, and the hot plug connector 4219 of the first midplane board 421 is coupled to the hot plug connector 4171 of the sixth motherboard 417. An extension board 423 is disposed on the first midplane board 421. The extension board 423 is electrically connected to the first midplane board 421 through the signal wire (not shown in the figures). The extension board 423 is coupled to the hot plug connector of the third motherboard 411 and the hot plug connector of the fourth motherboard 413 via hot plug connector. In one embodiment, the extension board 423 includes a hot plug connector 4231, the fourth mother board 413 includes a hot plug connector 4131, and the hot plug connector 4231 of the extension board 423 is coupled to the hot plug connector 4131 of the fourth motherboard 413. The first midplane board 421 includes a PCIe slot 4211, a PCIe slot 4213, a PCIe slot 4215 and a PCIe slot 4217. The PCIe slot 4211 is configured to couple to a PCIe card 491. The PCIe slot 4213 is configured to couple to a PCIe card 493. The PCIe slot 4215 is configured to couple to a PCIe card 495. The PCIe slot 4217 is configured to couple to a PCIe card 497. For example, the first midplane board 421 is T-shaped and includes an extension portion 4212. The PCIe slot 4211, the PCIe slot 4213, the PCIe slot 4215 and the PCIe slot 4217 are disposed on the extension portion 4212.

To sum up, the instant disclosure provides a server system having a hot plug motherboard further includes a plurality of motherboards and midplane boards. The midplane board includes at least one PCIe slot configured to be plugged with a PCIe card. The midplane board is coupled by means of hot plugging to each of the motherboards for increasing convenience. Besides, the fans of the fan module are used for decreasing the temperature of the heating elements of each of the motherboards and the temperature of each of the hard disks The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A server system having a hot plug motherboard, comprising:
a motherboard module including a plurality of motherboards;
at least one midplane board being coupled to each of the motherboards via a hot plug connector, the midplane board including at least one Peripheral Component Interconnect Express (PCIe) slot, the PCIe slot being configured to be plugged with a PCIe card; and
a hard disk module including a plurality of hard disks, the plurality of hard disks being coupled to the PCIe card through a first signal wire;
wherein the plurality of motherboards includes a first motherboard, a second motherboard, a third motherboard, a fourth motherboard, a fifth motherboard and a sixth motherboard connected to each other, the third motherboard and the fourth motherboard are parallel to each other, the fifth motherboard and the sixth motherboard are parallel to each other, the third motherboard and the fourth motherboard are disposed on the fifth motherboard and the sixth motherboard, the third motherboard is disposed opposite to the fifth motherboard, the fourth motherboard is disposed opposite to the sixth motherboard, the at least one midplane board includes a first midplane including a first hot plug connector, the first midplane is coupled to a second hot plug connector of the fifth motherboard and a third hot plug connector of the sixth motherboard through the first hot plug connector, an extension board is disposed on the first midplane board, the extension board includes a fourth hot plug connector and is electrically connected to the first midplane board through a second signal wire, and the extension board is coupled to a fifth hot plug connector of the third motherboard and a sixth hot plug connector of the fourth motherboard through the fourth hot plug connector.

2. The server system according to claim 1, further comprising:
a backplane with one end being coupled to the PCIe card through the signal wire, and the other end being coupled to each of the hard disks of the hard disk module.

3. The server system according to claim 1, wherein the first motherboard and the second motherboard are parallel to each other.

4. The server system according to claim 3, further comprising:

a power module disposed at a first position among the plurality of motherboards, wherein the power module is configured to provide electrical energy to the server system, the midplane board is T-shaped and includes an extension portion disposed at a second position among the plurality of motherboards and corresponding to the first position of the power module, and the PCIe slot is disposed on the extension portion.

5. The server system according to claim 3, further comprising:
a power module disposed on one longitudinal side of the server system, wherein the power module is configured to provide electrical energy to the server system, the midplane board is L-shaped and includes an extension portion disposed at the longitudinal side of the server system and corresponding to the power module, and the PCIe slot is disposed on the extension portion.

6. The server system according to claim 1, further comprising:
a power module disposed at a first position among the plurality of motherboards, wherein the power module is configured to provide electrical energy to the server system, the midplane board is T-shaped and includes an extension portion disposed at a second position among the plurality of motherboards and corresponding to the power module, and the PCIe slot is disposed on the extension portion.

7. The server system according to claim 1, comprising:
a power module disposed on one longitudinal side of the server system, wherein the power module is configured to provide electrical energy to the server system, the midplane board is L-shaped and includes an extension portion disposed at the longitudinal side of the server system and corresponding to the power module, and the PCIe slot is disposed on the extension portion.

8. The server system according to claim 1, including:
a temperature sensing module for sensing temperature of heating elements of each of the motherboards and temperature of each of the hard disks; and
a fan module for decreasing the temperature of the heating elements of each of the motherboards and the temperature of each of the hard disks.

9. A server system having a hot plug motherboard, comprising:
a machine casing;
a motherboard module including a plurality of motherboards configured in the machine casing; and
at least one midplane board being coupled to each of the motherboards via a hot plug connector, the midplane board including at least one Peripheral Component Interconnect Express (PCIe) slot, the PCIe slot being configured to be plugged with a PCIe card;
wherein the plurality of motherboards includes a first motherboard, a second motherboard, a third motherboard, a fourth motherboard, a fifth motherboard and a sixth motherboard connected to each other, the third motherboard and the fourth motherboard are parallel to each other, the fifth motherboard and the sixth motherboard are parallel to each other, the third motherboard and the fourth motherboard are disposed on the fifth motherboard and the sixth motherboard, the third motherboard is disposed opposite to the fifth motherboard, the fourth motherboard is disposed opposite to the sixth motherboard, the at least one midplane board includes a first midplane including a first hot plug connector, the first midplane is coupled to a second hot plug connector of the fifth motherboard and a third hot plug connector of the sixth motherboard through the first hot plug connector, an extension board is disposed on the first midplane board, the extension board includes a fourth hot plug connector and is electrically connected to the first midplane board through a second signal wire, and the extension board is coupled to a fifth hot plug connector of the third motherboard and a sixth hot plug connector of the fourth motherboard through the fourth hot plug connector.

10. The server system according to claim 9, wherein the midplane board is T-shaped or L-shaped and includes an extension portion, and the PCIe slot is disposed on the extension portion.

11. The server system according to claim 10, further comprising:
a power module configured to provide electrical energy to the server system;
a hard disk module including a plurality of hard disks, the plurality of hard disks being coupled to the PCIe card through a signal wire;
a backplane with one end being coupled to the PCIe card through the signal wire, and the other end being coupled to each of the hard disks of the hard disk module;
a temperature sensing module for sensing temperature of heating elements of each of the motherboards and temperature of each of the hard disks; and
a fan module for decreasing the temperature of the heating elements of each of the motherboards and the temperature of each of the hard disks.

* * * * *